(12) United States Patent (10) Patent No.: US 8,914,826 B2
Ruiz-Velasco et al. (45) Date of Patent: Dec. 16, 2014

(54) METHOD AND SYSTEM FOR CREATING A CHAPTER MENU FOR A VIDEO PROGRAM

(75) Inventors: Enrique Ruiz-Velasco, Flower Mound, TX (US); Japan A. Mehta, Irving, TX (US); Laxmi M. Patel, Irving, TX (US); Shafiq Kassam, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1146 days.

(21) Appl. No.: 12/342,693

(22) Filed: Dec. 23, 2008

(65) Prior Publication Data

US 2010/0162313 A1 Jun. 24, 2010

(51) Int. Cl.
*H04N 5/445* (2011.01)
*G11B 27/34* (2006.01)
*G11B 27/32* (2006.01)
*H04N 21/234* (2011.01)
*H04N 21/8549* (2011.01)

(52) U.S. Cl.
CPC ............ *H04N 21/8549* (2013.01); *G11B 27/34* (2013.01); *G11B 27/329* (2013.01); *H04N 21/23418* (2013.01)

USPC .............................. 725/37; 725/38; 386/241

(58) Field of Classification Search
CPC ............ H04N 21/2343; H04N 21/472; H04N 21/47205; H04N 21/83; H04N 21/845; H04N 21/8455; H04N 21/8456; H04N 21/8457
USPC ........................................ 725/37–61
See application file for complete search history.

(56) References Cited

U.S. PATENT DOCUMENTS

| | | | |
|---|---|---|---|
| 6,904,609 B1 * | 6/2005 | Pietraszak et al. .............. | 725/39 |
| 6,961,954 B1 * | 11/2005 | Maybury et al. ................ | 725/53 |
| 2003/0198463 A1 * | 10/2003 | Temple et al. ................ | 386/125 |
| 2003/0210261 A1 * | 11/2003 | Wu et al. ........................ | 345/719 |
| 2004/0210896 A1 * | 10/2004 | Chou et al. .................... | 717/174 |
| 2005/0141877 A1 * | 6/2005 | Yoo et al. ......................... | 386/95 |
| 2006/0126449 A1 * | 6/2006 | Urushihara et al. ........ | 369/30.01 |
| 2006/0282859 A1 * | 12/2006 | Garbow et al. ................ | 725/52 |

* cited by examiner

*Primary Examiner* — Nicholas Corbo (57) ABSTRACT

An approach is provided for the real-time creation of a menu of chapters for navigating a video program. The chaptering process creates at a dynamic chapter navigation menu that enables a user to precisely navigate within a video program by recursively creating chaptering points of finer temporal granularity for selecting a desired point within the video program.

18 Claims, 9 Drawing Sheets

METHOD AND SYSTEM FOR CREATING A CHAPTER MENU FOR A VIDEO PROGRAM

BACKGROUND INFORMATION

Advances in computers, interactive electronic communications, and the Internet have resulted in a reinvention of conventional entertainment and communication services to enhance programming, recording, and viewing of a growing library of video content. Today, it is not uncommon for consumers to have access to hundreds, if not thousands, of video programs from a multitude of sources such as broadcast television, on-demand programming, and other third party content providers available through the Internet. However, while the programming choices available to consumers have progressed, the way consumers access and view these choices have not kept pace. In many cases, a consumer must view a video program from the start or from where the consumer last viewed the program. Typically, the only way to navigate within a video program is through a fast forward or reverse function to advance or rewind through the program.

Therefore, there is a need for an approach that automatically and dynamically creates a menu of chapters for a video program to enable a consumer to easily and precisely navigate through the video program.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for creating a chapter menu for a video program are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
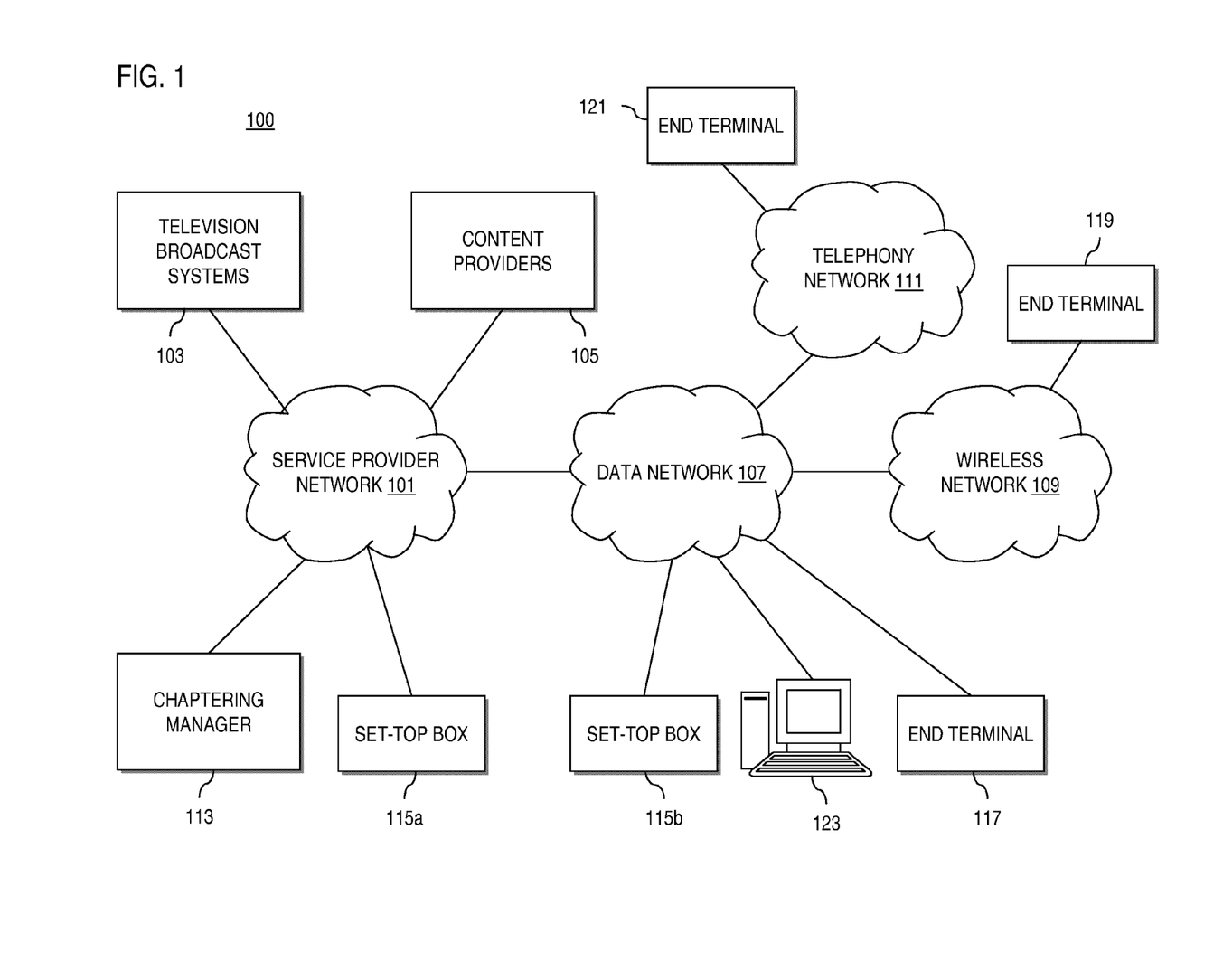
FIG. 1 is a diagram of a system capable of creating a chapter menu for a video program, according to an exemplary embodiment.

FIG. 1 is a diagram of a system capable of creating a chapter menu for a video program, according to an exemplary embodiment. For the purposes of illustration, a system 100 for creating a menu of chapters for a video program is described with respect to a service provider network 101 including one or more media service providers such as television broadcast systems 103 and content providers 105. It is contemplated that system 100 may embody many forms and include multiple and/or alternative components and facilities. As used herein, the terms STB, media-based device, and user equipment are interchangeable. Furthermore, video content is contemplated broadly to include a wide range of media. Video content can include any audio-video content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, etc.), Internet-based content (e.g., streamed video), and/or any other equivalent media form.

In addition, system 100 includes a data network 107, a wireless network 109, and a telephony network 111. It is contemplated that the data network 107 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network 109 may be, for example, a cellular network and may employ various technologies including code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like.

These networks 107-111, in conjunction with service provider network 101, can support various multimedia sessions containing a variety of video programs (e.g., television broadcasts, on-demand videos, etc.). Chaptering manager platform 113 introduces the capability to automatically and dynamically create a chapter menu for each video program supported by system 100. As shown in FIG. 1, the platform 113 resides on the network side. In addition (or alternatively), the chaptering manager platform 113 may reside within a customer premises equipment (CPE) (not shown) or the media device itself. Specifically, the chaptering manager platform 113 processes a video program to define chaptering points (e.g., at defined timed intervals), presents theses chapters as a menu to the user, and enables the user to select a particular chapter for either playback or creation of additional chaptering points at a finer temporal granularity. Moreover, the chaptering manager platform 113 may be configured to create the chaptering menu in real-time. In this way, the chaptering manger platform 113 enables the user to precisely identify and navigate to specific points within a video program by recursively creating chaptering points at finer time intervals at the user's request.

As discussed above, users have been limited primarily to fast forwarding and rewinding to navigate to specific points within a video program. The chaptering manager platform 113 enhances navigational flexibility by dynamically creating chapter menus for all video programs including both live and previously recorded video programs, thereby enabling a user to select any desired point to view a video program.

As seen in FIG. 1, the chaptering manager platform 113 has connectivity to STBs 115*a* and 115*b* via service provider network 101 and data network 107 respectively. The platform 113 also has connectivity to end terminal 117 via data network 107, end terminal 119 via wireless network 109, and end terminal 121 via telephony network 111. Any of the devices (i.e., STBs 115*a*-115*b* and end terminals 117-121) may provide access to the services and functions of the chaptering manager platform 113.

For example, end terminal 117 may be any computing device (e.g., Personal Digital Assistant (PDA), personal computer, laptop, etc.) or communication device (e.g., a video conferencing terminal, a digital home communication terminal (DHCT) capable of providing access to the services and functions of the chaptering manager platform 113. End terminal 119 may be any video-enabled mobile device (e.g., a mobile handset, video-capable cellular telephone, etc.). Furthermore, end terminal 121 may, for instance, include a home communication terminal (HCT) or any other telephonic device capable of accessing the services and functions of the chaptering manager platform 113.

The data network 107 additionally permits a host 123 to access chaptering manager platform 113 services and functions via a graphical user interface (GUI) such as a browser application or any web-based application for STBs 115*a*-115*b* and/or end terminals 117-121. Under one scenario, it is contemplated that a user can configure chaptering manager services, functions, and preferences for STBs 115*a*-115*b* and/or end terminals 117-121 via a web browser.

STBs 115*a*-115*b* and/or end terminals 117-121 can communicate using data network 107, wireless network 109, and/or telephony network 111. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, Long Term Evolution (LTE) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS network, a TIVO™ network, etc), and the like. Such networks may also utilize any suitable protocol supportive of data communications, e.g., transmission control protocol (TCP), Internet protocol (IP), user datagram protocol (UDP), hypertext markup language (HTML), dynamic HTML (DHTML), file transfer protocol (FTP), telnet, hypertext transfer protocol (HTTP), asynchronous transfer mode (ATM), wireless application protocol (WAP), socket connection (e.g., secure sockets layer (SSL)), Ethernet, frame relay, and the like, to connect STBs 115*a*-115*b* and/or end terminals 117-121 to the chaptering manager platform 113 and to various sources of video content.

Although depicted in FIG. 1 as separate networks, data network 107, wireless network 109, and/or telephony network 111 may be completely or partially contained within service provider network 101. For example, service provider network 101 may include facilities to provide for transport of packet-based, wireless, and/or telephony communications. As such, exemplary embodiments of chaptering manager platform 113 may, for instance, comprise hypertext markup language (HTML) user interfaces or JAVA™ applets accessed via world-wide-web pages. These interfaces are particularly useful in extending system 100 functionality to devices having limited resources (e.g., PDAs, handsets, thin-clients, etc.), as well as providing scalable solutions to varied devices without necessitating intensive high-end costs associated with independent design, tooling, and manufacturing.

In particular embodiments, service provider network 101 can include an IPTV system (not shown) configured to support the transmission of television video programs from television broadcast systems 103 as well as other video content, such as media content from the various third-party content providers 105 utilizing IP. That is, the IPTV system may deliver signals and/or video content in the form of IP packets. Further, the transmission network (e.g., service provider network 101) may optionally support end-to-end data encryption in conjunction with the delivery of video content.

In this manner, the use of IP permits video content to be integrated with broadband Internet services, and thus, share common connections to a user site. Also, IP packets can be more readily manipulated, and therefore, provide users with greater flexibility in terms of control, as well as offer superior methods for increasing the availability of video content. Delivery of video content, by way of example, may be through a multicast from the IPTV system to the STBs 115*a*-115*b* and end terminals 117-121. Any individual STB or end terminal may tune to a particular video source by simply joining a multicast (or unicast) of the video content utilizing an IP group membership protocol (IGMP). For instance, the IGMP v2 protocol may be employed for joining STBs to new multicast (or unicast) groups. Such a manner of delivery avoids the need for expensive tuners to view video content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the video content may be provided to various IP-enabled devices, such as the computing, telephony, and mobile apparatuses previously delineated.

While system 100 is illustrated in FIG. 1, the exemplary components are not intended to be limiting, and indeed, additional or alternative components and/or implementations may be utilized.

In one embodiment, the chaptering service is a managed service, whereby a service provider operates the platform 113 to serve one or more subscribers.

Figure 2:
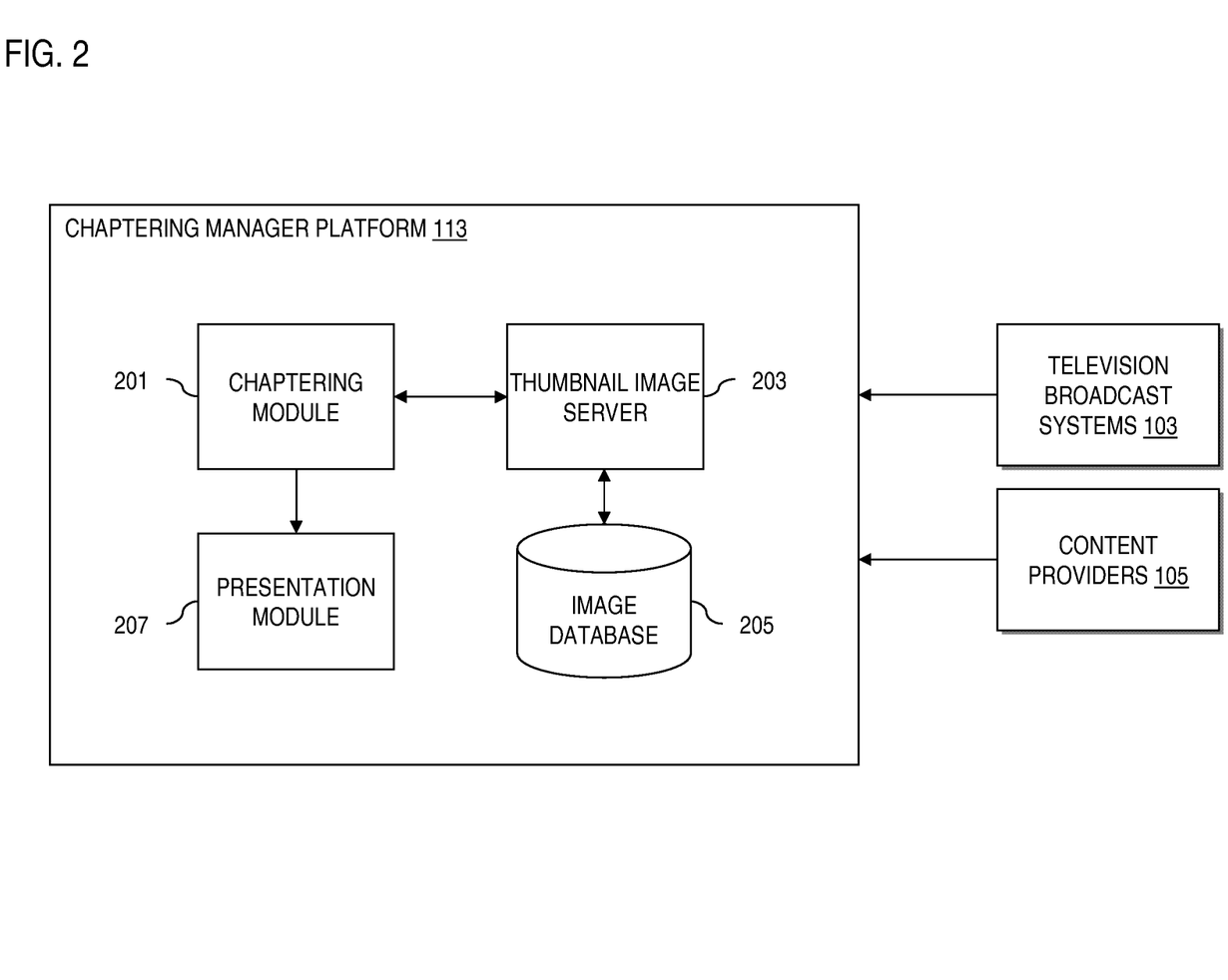
FIG. 2 is a diagram of the components of a chaptering manager platform, according to an exemplary embodiment.

FIG. 2 is a diagram of the components of a chaptering manager platform, according to an exemplary embodiment. By way of example, the chaptering manager platform 113 may include one or more of the modules and/or databases to create a menu of chapters for a video program. The platform 113 may also have connectivity to television broadcast systems 103 and content providers 105 to access video content. Within platform 113, a chaptering module 201 creates a menu of chapters for a requested video program by determining the appropriate chaptering points based on user input and/or default system settings. In exemplary embodiments in which menu chapters are represented by a thumbnail image of the video program at each chaptering point, the chaptering module 201 interacts with a thumbnail image server 203. The thumbnail image server 203 may, for instance, respond to requests for images by either capturing the requested images from the video program or retrieving the images from an image database 205 if the images have been previously captured.

In certain embodiments, the thumbnail image server 203 may include a video slicer (not pictured) that has connectivity to video content providers (e.g., television broadcast systems 103 and content providers 105). The video slicer is capable of capturing images of a video program and marking the images with a time stamp corresponding to the time within the video program an image was captured. The image database 205 may then store the images captured by the thumbnail image server 203 and organize the images by video programming information (e.g., broadcast channel, broadcast time, description, video source type, etc.) for later retrieval. Moreover, the thumbnail image server 203 is capable of capturing images from video programs in real-time. In this way, the chaptering manger platform 113 can provide a menu of chapters as a video program progresses. It is also contemplated that the image database 205 may store images of video programs created by means other than the thumbnail image server 203 such as images generated by the video content providers themselves (e.g., television broadcast systems 103 and content providers 105) and transmitted to the chaptering manager platform 113. The chaptering module 201 may then retrieve these pre-generated images for use in creating the chaptering menu.

After obtaining the appropriate images of the video program from the thumbnail image server 203, the chaptering module 201 creates a menu of chapters and transmits the menu to the presentation module 207 for presentation to the user. In certain embodiments, the chaptering module 201 may be configured to represent each chaptering point by an indicator other than an image (e.g., video clip, animation, icon, text label, time marker, etc.). In this case, the thumbnail image server 203 may be configured to generate or retrieve the alternate indicator (e.g., video clip, animation, icon, text label, time marker, or other similar indicator) in response to a request from the chaptering module 201. The presentation module 207 may then present the menu of chapters with the appropriate indicators to the user.

Although chaptering module 201, thumbnail image server 203, image database 205, and presentation module 207 are depicted in FIG. 2 as separate modules of the chaptering manager platform 113, it is contemplated that the separate modules may be partially or completely incorporated within the thumbnail image server 203. For instance, the functions of the chaptering module 201, image database 205, and presentation module 207 may be incorporated within the thumbnail image server 203.

Figure 3:
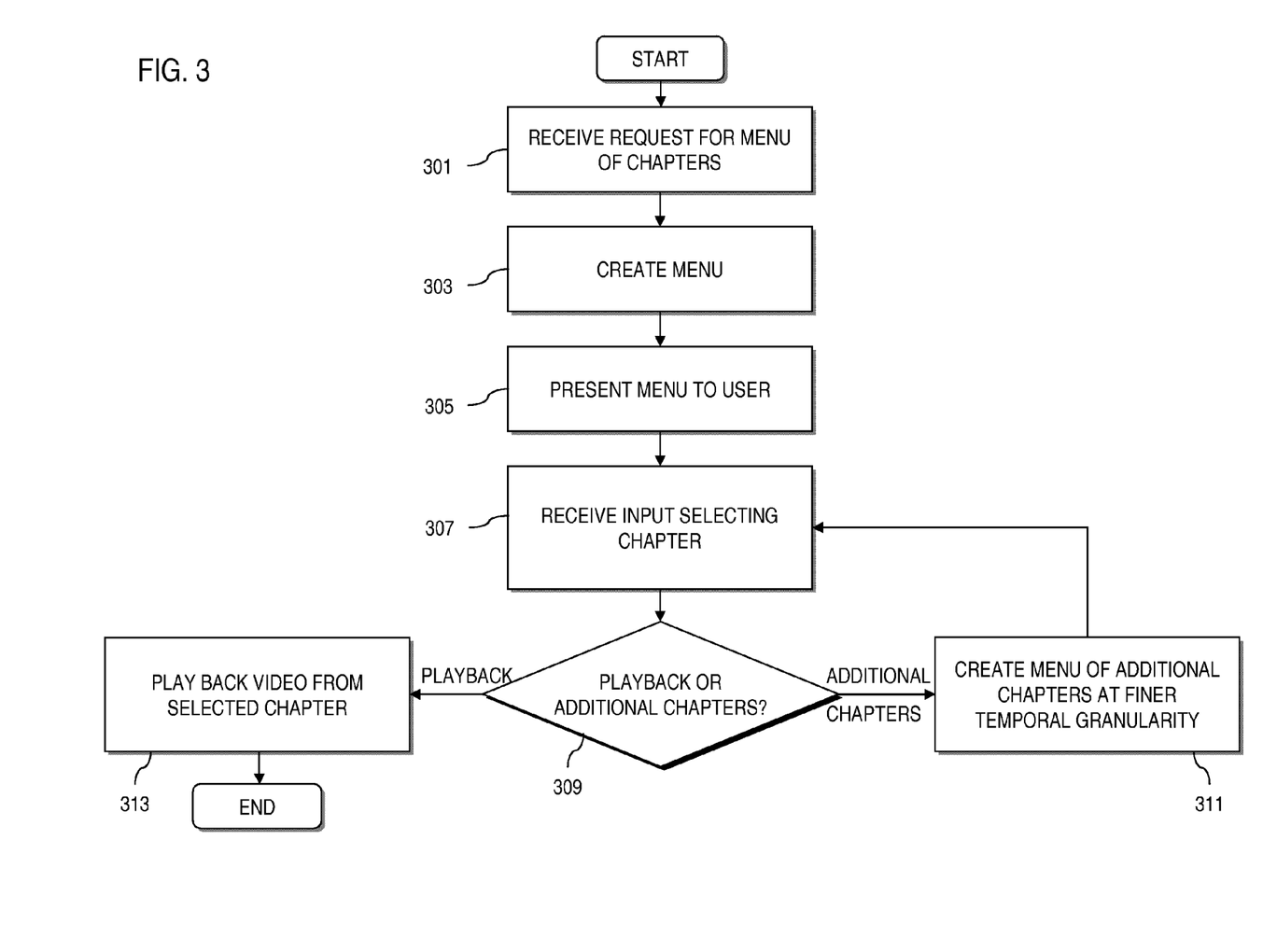
FIG. 3 is a flowchart of a process for creating a chapter menu for a video program, according to an exemplary embodiment.

FIG. 3 is a flowchart of a process for creating a chapter menu for a video program, according to an exemplary embodiment. In step 301, the chaptering manager platform 113 receives a request for creating a menu of chapters for a video program. It is contemplated that this request may be made automatically when a user selects a video program to view or manually through a specific command from the user. For example, in automatic mode, the user's device (e.g., STBs 115a-115b or end terminals 117-121) will generate a new request for a chaptering menu for each program the user views. As a result, the chaptering manager platform 113 may, for example, create a new chaptering menu every time the user switches from one video program to another. In manual mode, the user may initiate a specific request for the chaptering manager platform 113 to create a chaptering menu. In exemplary embodiments, this manual request also may be made through the user's device (e.g., STBs 115a-115b or end terminals 117-121).

In response to a request, the chaptering manager platform 113 creates a menu of chapters based on either default system settings or user-defined settings (step 303). In exemplary embodiments, the chaptering manager platform 113 may define chaptering points within a video program according to set intervals. These intervals may be specified as a specific time increment (e.g., every 5 minutes, every 10 minutes, every 15 minutes, etc.) or as a specific number of chapters to display at one time (e.g., 5 chaptering points, 10 chaptering points, etc.). These intervals may be set to default values or may be specified by the user. It is also contemplated that the service provider may define these intervals based usability studies.

For example, when the chaptering manager platform 113 is configured to create a menu of chapters based on a specific time increment, the platform 113 will set chaptering points at each specific time increment (e.g., every 10 minutes) throughout the video program. If the video program is broadcast live, the chaptering manager platform 113 will create a chapter at the beginning of the program and at each specified time increment as the broadcast progresses in real-time. For instance, after 30 minutes of a live broadcast with a specified chaptering increment of 10 minutes, the chaptering manager platform 113 will have created chaptering points at 0 minutes, 10 minutes, 20 minutes, and 30 minutes. If the broadcast is not live (e.g., recorded content, on-demand content), the chaptering manager platform 113 can create chaptering points at the specified time increment for the entire video program at once.

Similarly, when the chaptering manager platform 113 is configured to create a menu of chapters based on a specific number of chapters (e.g., 5 chapters, 10 chapters, etc.), the chaptering manager platform 113 divides the video program into equal segments with the requested number of chapters. For example, if the user selects five chapters, the chaptering manager platform 113 creates a menu of chapters that contains five chaptering points regardless of the length of the video program.

After creating the menu, the chaptering manager platform 113 presents the menu of chapters to the user (step 305). This menu presentation may, for example, include a display of thumbnails representing each chaptering point (see discussion below of an exemplary interface with respect to FIG. 7 for additional details of the display). The chaptering manager platform 113 may then receive input from the user for selecting a particular chapter from the menu (step 307) for either playback or creation of a menu of additional chapters defined at a finer temporal granularity (step 309). If the user selects the creation of additional chapters, the chaptering manager platform 113 creates and presents another menu with chaptering points defined at a finer temporal granularity (i.e., at smaller time intervals) (step 311). For example, if the original menu of chapters was defined at every 10 minutes, the chaptering points of the new menu may be defined at every 5 minutes spanning the selected chaptering point and adjacent chaptering points. If the original menu was defined at a specified number of chapters such as five chapters, the chaptering points of new menu may be defined with five chapters spanning the interval between the selected chaptering point and adjacent chaptering points. The process of FIG. 3 then returns to step 307 to await additional input from the user. The process of creating additional chaptering points may continue recursively to provide a menu of chapters defined at increasingly smaller time intervals.

Once the user selects a playback point, the chaptering manager platform 113 will begin playback from the selected chapter (step 313). In exemplary embodiments, the user may also use the forward and rewind functions to skip forward or backward from chapter to chapter.

As discussed above, the step of creating a menu of chapters may, for example, occur in two ways: (1) creating the menu by capturing images directly from a video program, or (2) creating the menu by retrieving images of a video program from an image database.

Figure 4:
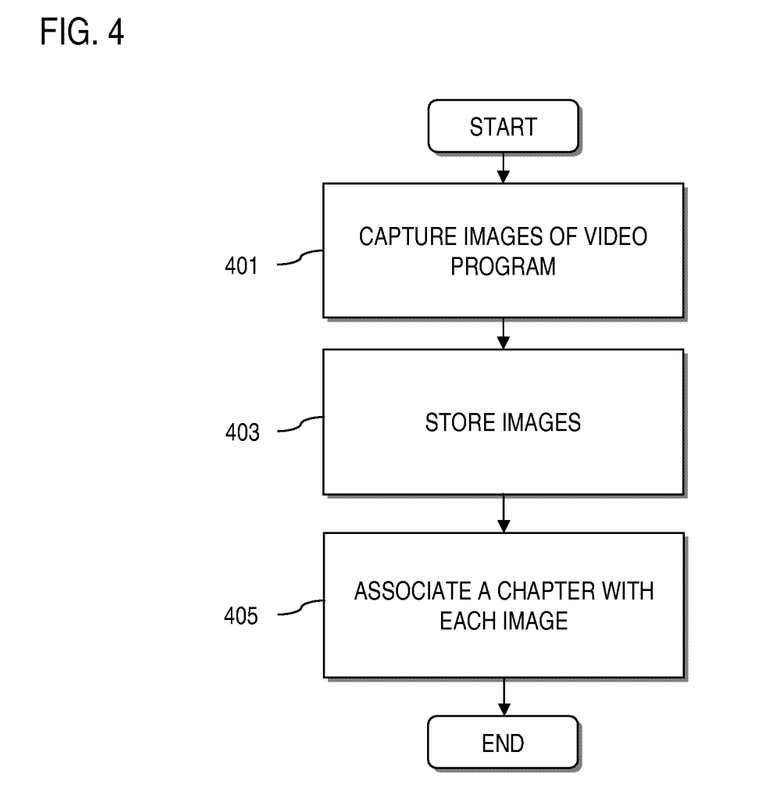
FIG. 4 is a flowchart of a process for creating a chapter menu by capturing images of a video program, according to an exemplary embodiment.

FIG. 4 is a flowchart of a process for creating a chapter menu by capturing images of a video program, according to an exemplary embodiment. In step 401, the thumbnail image server 203 of chaptering manager platform 113 captures images of the video program corresponding to the desired chaptering points. For example, if the chaptering points are defined every 10 minutes, the thumbnail image server 203 will capture an image of the video program every 10 minutes. Once captured, the images along with associated programming information (e.g., broadcast channel, broadcast time, description, video source type, etc.) are stored, as in step 403, in image database 205 for later retrieval. The chaptering module 201 of the chaptering manager platform 113 then associates a chaptering point with each captured image to create the menu of chapters (step 405).

Figure 5:
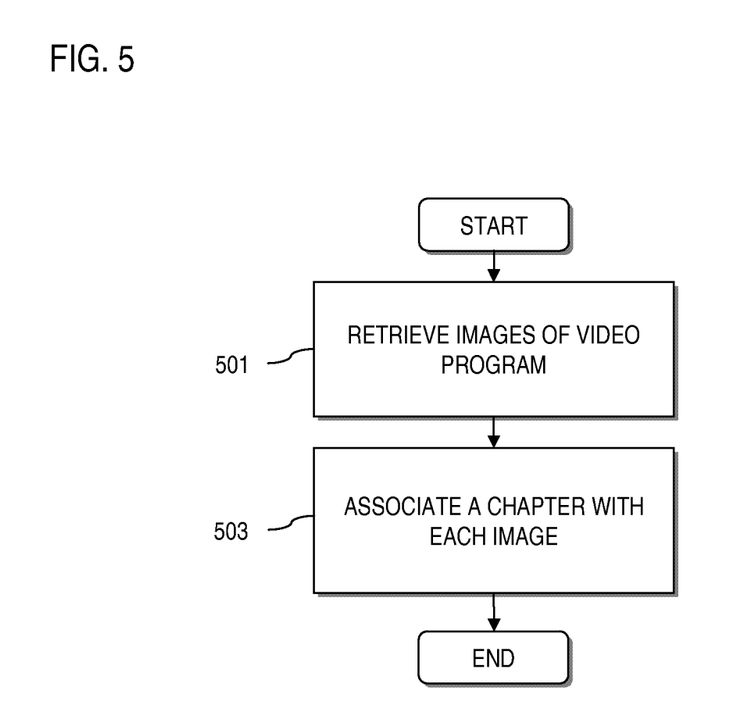
FIG. 5 is a flowchart of a process for creating a chapter menu by retrieving images of a video program from an image database, according to an exemplary embodiment.

FIG. 5 is a flowchart of a process for creating a chapter menu by retrieving images of a video program from an image database, according to an exemplary embodiment. Before capturing images from a video program as described with respect to FIG. 4, the thumbnail image server 203 of chaptering manager platform 113 may check the image database 205 to determine whether the desired images have previously been captured or stored. The thumbnail image server 203 may search for the availability of the images based on the programming information associated with the video program. If the images are available, the thumbnail image server 203 can retrieve the images from the image database 205 (step 501). The chaptering module 201 of the chaptering manager platform 113 then associates a chaptering point with each retrieved image to create the menu of chapters (step 503).

Figure 6:
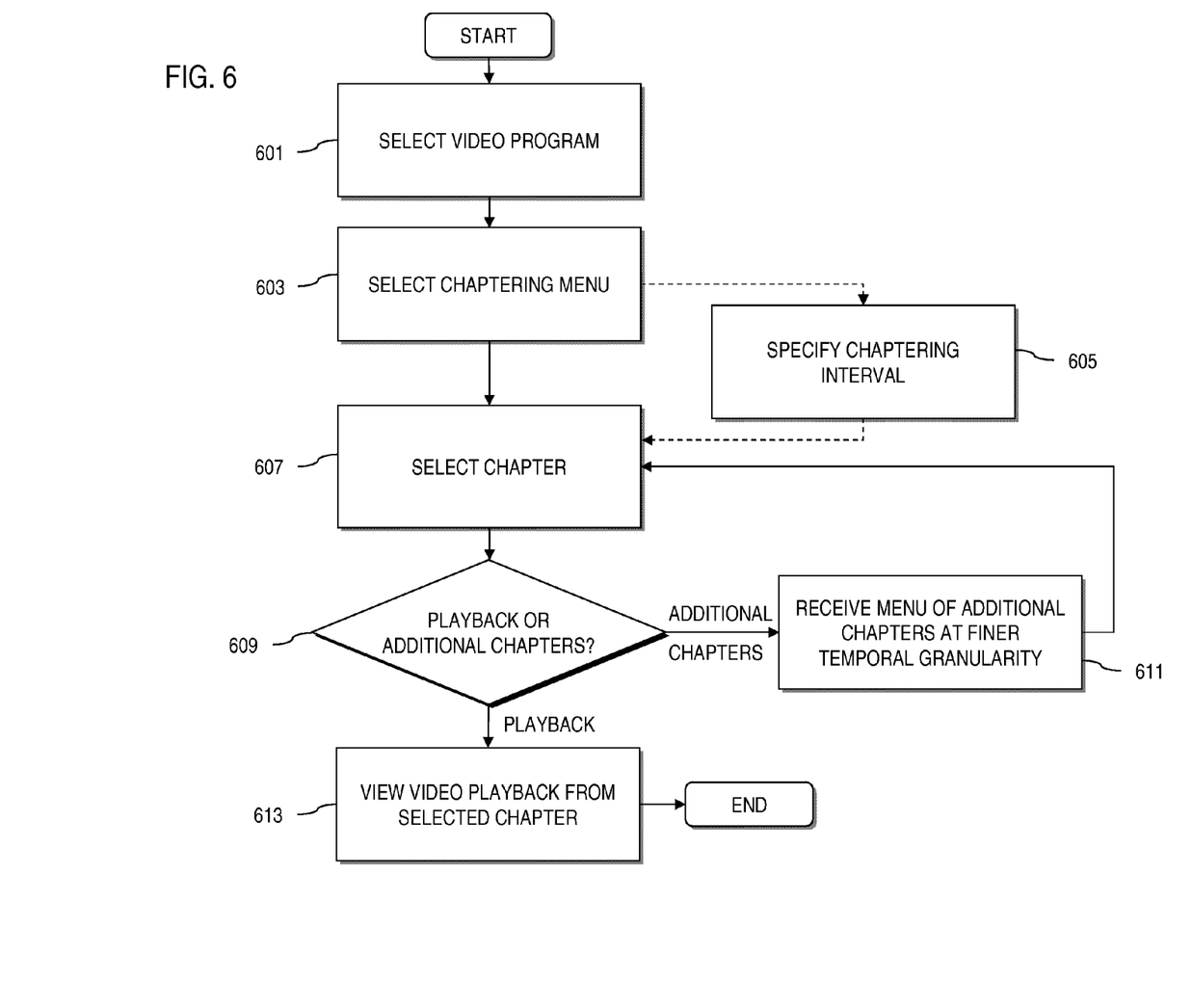
FIG. 6 is a flowchart of a process for accessing the functions of the chaptering manager platform from a user's perspective, according to an exemplary embodiment.

FIG. 6 is a flowchart of a process for accessing the functions of the chaptering manager platform from a user's perspective, according to an exemplary embodiment. In step 601, the user selects a video program to view on the user's device (e.g., STBs 115a-115b or end terminals 117-121). The video program may include broadcast content, digital video recorder (DVR) content, pay-per-view content, IPTV content, pre-recorded media content, data communication services content (e.g., commercials, advertisements, videos, movies), Internet-based content, and/or other similar video content. Once the video program is selected, the user may then select to access the chaptering menu for the video content (step 603). The process of either selecting the video program or selecting the chaptering menu may initiate a request to the chaptering manager platform 113 to create a chaptering menu. At this point or any other point, the user has the option to specify a chaptering interval for creation of the menu (step 605). As discussed previously, the interval may be defined as a time increment or a specific number of chapters.

On accessing the chaptering menu, the user may select a particular chapter from the menu (step 607) for playback or for the creation of a menu of additional chaptering points (step 609). If the user selects a particular chapter for creation of additional chaptering points, the user will receive a menu of additional chapters defined at a finer temporal granularity surrounding the selected chaptering point (step 611). The menu is created per the process described with respect to FIG. 3 above. The user may then select another chaptering point for either playback or creation of another round of additional chaptering points (step 607). The user may repeat this cycle until finding the desired chaptering point. If the user selects a chaptering point for playback, the user can then view the video program from the selected chaptering point (step 613). In exemplary embodiments, the user also has the option to forward or rewind between chaptering points to navigate through a video program.

Figure 7:
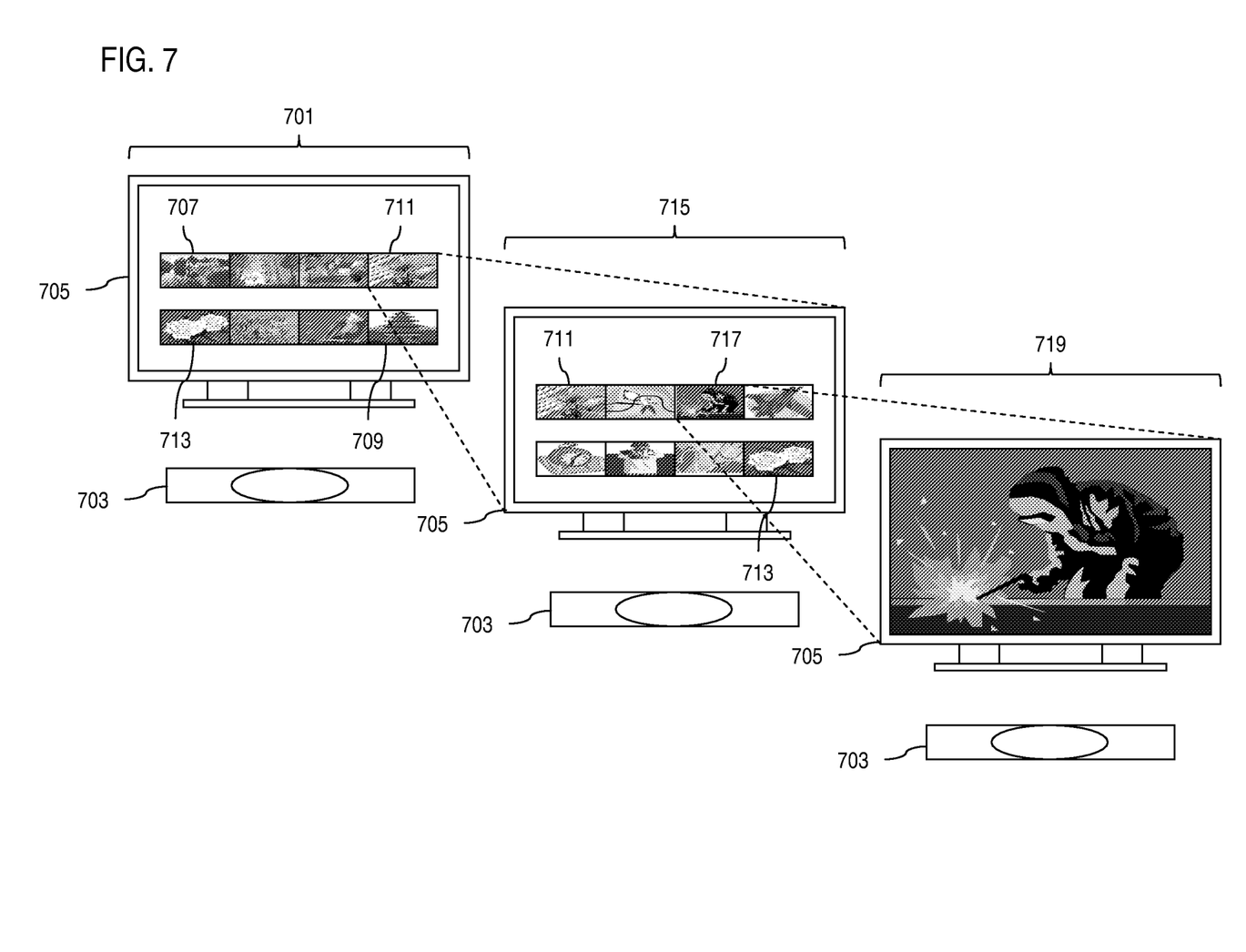
FIG. 7 depicts an exemplary graphical user interface (GUI) for a chapter menu, according to an exemplary embodiment.

FIG. 7 depicts an exemplary graphical user interface (GUI) for a chapter menu, according to an exemplary embodiment. Exemplary GUI 701 depicts the output of an STB 703 as displayed on television 705. In this example, STB 703 displays a chapter menu for a video program. STB 703 has been configured to show, for instance, eight chaptering points at a time. In GUI 701, thumbnail image 707 represents the first chaptering point in the video program and thumbnail image 709 represents the last chaptering point in the video program. The user selects thumbnail image 711 for creation of additional chaptering points. For reference, thumbnail image 713 represents the chaptering point immediately adjacent to the selected thumbnail image 711. As depicted in GUI 715, the selection of thumbnail image 711 results in the creation of additional chaptering points spanning the time interval represented by thumbnail image 711 and thumbnail image 713. In GUI 715, the user then selects, for example, thumbnail image 717 for playback. This selection results in playback of the video program beginning from the chaptering point represented by thumbnail image 717, as depicted in GUI 719.

Figure 8:
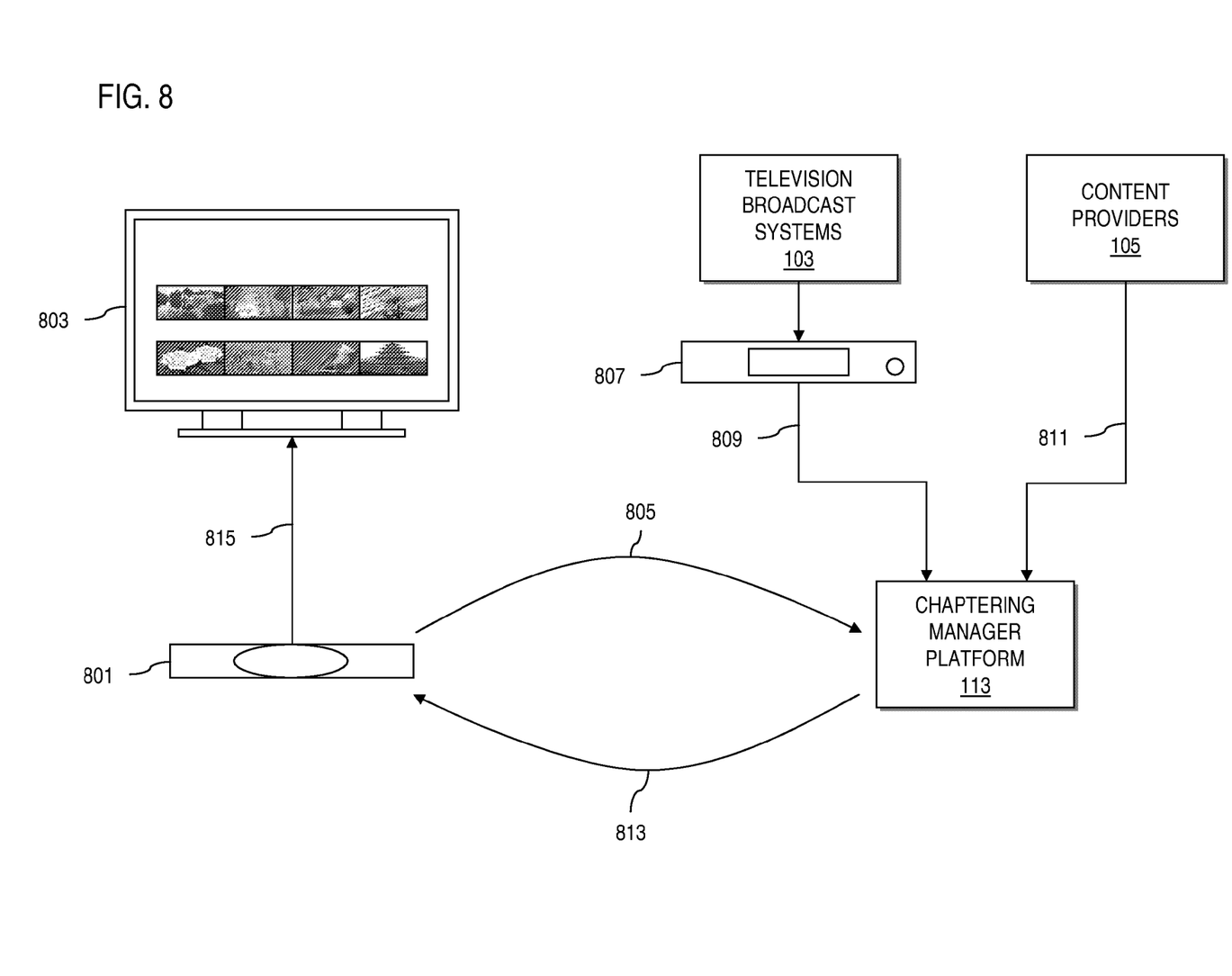
FIG. 8 is a diagram illustrating the interaction between a set-top box and the chaptering manager platform, according to an exemplary embodiment.

FIG. 8 is a diagram illustrating the interaction between a set-top box and the chaptering manager platform, according to an exemplary embodiment. In this example, a STB 801, using the chaptering manager service, is connected to a television 803. The user has requested that STB 801 display a chaptering menu for a video program. In step 805, STB 801 sends a request for a chaptering menu to chaptering manager platform 113. The request may, for example, include information identifying the video program (e.g., broadcast channel number and time) as well as settings (e.g., chaptering interval) for creating the menu.

In response to this request, the chaptering manager platform 113 searches its image database 205 for images representing the requested chaptering points. If the images are not available in the image database 205, the chaptering manager platform 113 captures the requested images directly from the video program. To facilitate this process, the chaptering manager platform is connected to television broadcast systems 103 via a video hub office (VHO) 807 and to content providers 105. In this example, VHO 807 provides aggregate connectivity to both national and local broadcast systems. In other embodiments, VHO 807 may provide connectivity to local broadcast systems while a super headend (SHE) (not shown) provides connectivity to national broadcast systems. If the requested images are from a broadcast video program, the chaptering manager platform 113 captures images directly from the television broadcast systems 103 via VHO 807 (step 809) and creates the chaptering menu. If the program is obtained from content providers 105, the chaptering manger platform 113 captures the requested images from the providers (step 811) and creates the menu. The chaptering manager platform 113 then transmits the menu to STB 801 (step 813) for presentation to the user on television 803 (step 815).

The processes described herein for creating a menu of chapters for a video program may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
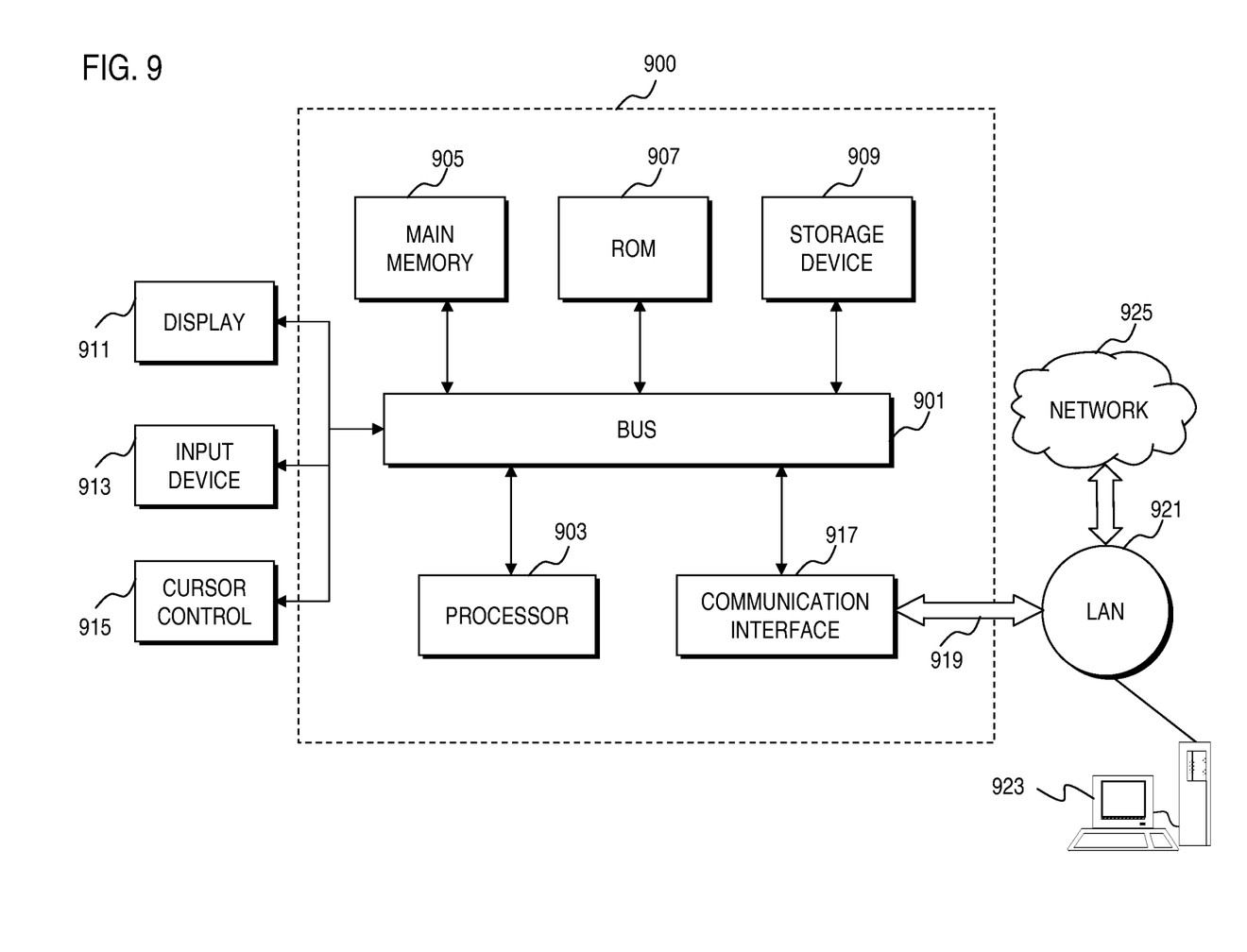
FIG. 9 is a diagram of a computer system that can be used to implement various exemplary embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving a request from a user for creating a menu of chapters for a video program, each chapter representing a video segment of the video program;
creating, by a processor, an updateable menu based on the request;
presenting the user with the updateable menu; and
receiving input from the user for selecting a particular chapter from and/or updating the updateable menu,
wherein the video program includes at least broadcast content, pay-per-view content, Internet Protocol Television content, data communication services content, Internet-based content, or combination thereof, and is provided to the user by one or more service providers and/or content providers
wherein the updateable menu includes a plurality of chapters designated as beginning by a plurality of chapter points, and a common time interval is provided between each adjacent chapter point,
wherein an input from the user results in creation in the updateable menu of chapters of a plurality of sub-chapters in the common time interval between at least one set of adjacent chapter points, and the common interval between all adjacent chapter points is not changed by the plurality of sub-chapters, and
wherein the plurality of sub-chapters in the updateable menu of chapters are designated as beginning by a plurality of sub-chapter points, and another common time interval is provided between each adjacent subchapter point that is less that the common time interval between each adjacent chapter point.

2. A method of claim 1, wherein the input results in playback from the particular chapter.

3. A method of claim 1, wherein the user specifies the common interval that will be between all adjacent chapter points or specifies a number of chapters to be in the updateable menu of chapters.

4. A method of claim 1, wherein each chapter in the updateable menu is represented by one or more of an image, video clip, animation, icon, text label, or time marker.

5. A method of claim 1, wherein the step of creating the updateable menu of chapters includes:
capturing a plurality of images of the video program;
storing each image in an image database; and
associating a chapter with each image.

6. A method of claim 1, wherein the step of creating the updateable menu of chapters includes:
retrieving a plurality of images of the video program from an image database; and
associating a chapter with each image.

7. A method of claim 6, wherein the image database includes a plurality of images captured from a plurality of video programs, the plurality of the images captured from the plurality of video programs being organized according to programming information that includes at least one of broadcast channel, broadcast time, description, and video source type.

8. A set-top box apparatus comprising:
an input interface configured to receive a request from a user for creating a menu of chapters for a video program, each chapter representing a video segment of the video program;
a chaptering module configured to create an updateable menu based on the request;
a presentation module configured to present the user with the updateable menu; and
the input interface further configured to receive input from the user for selecting a particular chapter and/or updating the updateable menu,
wherein the video program includes at least broadcast content, pay-per-view content, Internet Protocol Television content, data communication services content, Interact-based content, or combination thereof, and is provided to the user by one or more service providers and/or content providers,
wherein the updateable menu includes a plurality of chapters designated as beginning by a plurality of chapter points, and a common time interval is provided between each adjacent chapter point,
wherein an input from the user results in creation in the updateable menu of chapters of a plurality of sub-chapters in the common time interval between at least one set of adjacent chapter points, and the common interval between all adjacent chapter points is not changed by the plurality of sub-chapters, and wherein the plurality of sub-chapters in the updateable menu of chapters are designated as beginning by a plurality of sub-chapter points, and another common time interval is provided between each adjacent subchapter point that is less that the common time interval between each adjacent chapter point.

9. An apparatus of claim 8, wherein the input results in playback from the particular chapter.

10. An apparatus of claim 8, wherein the user specifies the common interval that will be between all adjacent chapter points or specifies a number of chapters to be in the updateable menu of chapters.

11. An apparatus of claim 8, wherein each chapter in the updateable menu is represented by one or more of an image, video clip, animation, icon, text label, or time marker.

12. An apparatus of claim 8, further comprising:
an image database configured to store a plurality of images from a plurality of video programs;
a thumbnail image server configured to capture a plurality of images of the video program and store the plurality of images of the video program in the image database, or to retrieve multiple images of the plurality of images from the plurality of video programs from the image database; and a chaptering module further configured to associate a chapter with one of the plurality of captured images or one of the multiple images of the plurality of images from the plurality of video programs.

13. An apparatus of claim 12, wherein the plurality of images stored within the image database are organized according to programming information.

14. A method of claim 13, wherein the programming information includes broadcast channel, broadcast time, description, and video source type.

15. A system comprising:

a processor configured to receive a request from a user for creating a menu of chapters for a video program, each chapter representing a video segment of the video program, create an updateable menu based on the request, present the user with the updateable menu, and receive input from the user for selecting a particular chapter and/or updating the updatable menu, wherein the input results in either playback from the particular chapter or presentation of a menu of additional chapters defined at a finer temporal granularity, wherein the chaptering manager is coupled to a multimedia system with connectivity to a plurality of video sources, wherein the video program includes at least broadcast content, pay-per-view content, Internet Protocol Television content, data communication services content, Internet-based content, or combination thereof, and is provided to the user by one or more service providers and/or content providers, wherein the updateable menu includes a plurality of chapters designated as beginning by a plurality of chapter points, and a common time interval is provided between each adjacent chapter point, wherein an input from the user results in creation in the updateable menu of chapters of a plurality of sub-chapters in the common time interval between at least one set of adjacent chapter points, and the common interval between all adjacent chapter points is not changed by the plurality of sub-chapters, and wherein the plurality of sub-chapters in the updateable menu of chapters are designated as beginning by a plurality of sub-chapter points, and another common time interval is provided between each adjacent subchapter point that is less that the common time interval between each adjacent chapter point.

16. A system of claim 15, wherein the chaptering manager is further configured to capture a plurality of images of the video program, store each image in an image database, and associate a chapter with each image.

17. A system of claim 15, wherein the chaptering manager is further configured to retrieve a plurality of images of the video program from an image database, and associate a chapter with each image.

18. A method of claim 1, wherein the video program is a live video program.

* * * * *